United States Patent [19]

Bednar et al.

[11] Patent Number: 5,825,506
[45] Date of Patent: *Oct. 20, 1998

[54] METHOD AND APPARATUS FOR IMAGE PROCESSING AT REMOTE SITES

[75] Inventors: Gregory M. Bednar, Matthews; Thomas E. Carr, Charlotte; Craig D. Curley, Charlotte; Lynn P. Curley, Charlotte; Dorothy I. Mazina, Charlotte; Paul L. Olson, Charlotte; Filip J. Yeskel, Charlotte, all of N.C.

[73] Assignee: International Business Machines Corporation, Armonk, N.Y.

[*] Notice: The term of this patent shall not extend beyond the expiration date of Pat. No. 5,506,691.

[21] Appl. No.: 478,576

[22] Filed: Jun. 7, 1995

Related U.S. Application Data

[62] Division of Ser. No. 216,704, Mar. 23, 1994, Pat. No. 5,506,691.

[51] Int. Cl.$^6$ .................................................... H04N 1/00
[52] U.S. Cl. ........................ 358/402; 358/403; 382/137; 382/139; 382/140
[58] Field of Search .................................. 358/402, 403, 358/404, 444, 468, 434, 467, 453, 448, 400; 209/534; 235/375, 382, 380; 382/137–140, 305, 306; 395/242, 200.01, 490; 364/242.94

[56] References Cited

U.S. PATENT DOCUMENTS

| 4,315,246 | 2/1982 | Milford | 382/140 |
| 5,274,567 | 12/1993 | Kallin et al. | 382/137 |
| 5,321,816 | 6/1994 | Rogan et al. | 395/200.01 |
| 5,362,948 | 11/1994 | Morimoto | 358/408 |
| 5,388,165 | 2/1995 | Deaton et al. | 382/139 |
| 5,396,341 | 3/1995 | Takahashi et al. | 358/444 |
| 5,444,794 | 8/1995 | Uhland, Sr. | 382/137 |
| 5,550,359 | 8/1996 | Bennett | 235/382 |
| 5,602,936 | 2/1997 | Green et al. | 382/140 |

*Primary Examiner*—Edward L. Coles
*Assistant Examiner*—Cheukfan Lee
*Attorney, Agent, or Firm*—Kenneth A. Seaman

[57] ABSTRACT

An image processing and retrieval system in which images are captured and stored at the remote site where the document processor is located which codelines from the documents are captured and transmitted to a central host computer site, whereby the accounting and financial records may be done at the host computer at the central site and image statements and other image processing activity to process the image may be done at remote sites.

1 Claim, 4 Drawing Sheets

METHOD AND APPARATUS FOR IMAGE PROCESSING AT REMOTE SITES

The application is a division of application Ser. No. 08/216,704, filed Mar. 23, 1994, now U.S. Pat. No. 5,506,691.

BACKGROUND OF THE INVENTION

1. Field of the Invention

The present invention relates to image processing. More particularly, the present invention relates to document processing in which images and machine-readable (or coded or codeline) data are sequentially lifted from documents as they pass an imaging station and codeline reader station along the way from an input hopper to one of a plurality of sorting pockets. The present invention has particular application to the processing of financial documents in a banking environment, although it is not limited thereto, and applies to those image processing situations where the document processing is done remote from the central or host computer.

2. Background Art

Various approaches have been suggested for the image processing of checks and other financial documents in a banking environment. One such approach is disclosed in U.S. Pat. No. 4,888,812 entitled "Document Image Processing System" to R. F. Dinan et al., herein incorporated by reference and sometimes referred to as the "Dinan Patent." In the Dinan Patent, an architecture for the capture and processing of images in a bank situation is disclosed.

Another approach to image processing is disclosed in U.S. Pat. No. 4,205,780 entitled "Document Processing System and Method" to Burns et al. and assigned to Teknekron, Inc. This patent, the teachings of which are hereby incorporated herein by reference, is sometimes referred to as the "Burns Patent."

In both the Dinan Patent and the Burns Patent, the concept of an image camera mounted within a document processing system to capture and store digital images of a document is well disclosed. The document being processed in each of these patents also includes machine-readable MICR-style characters (referred to as codeline data), either readable through using OCR or magnetic techniques, to identify the account number and other identifying information on the check.

In each of these situations, the document processing system is coupled to a local host computer for the local processing of information. In some cases, however, the bank would prefer to have the document transport at a site remote (many miles or even states away) from its host or central computer. In some cases, it would be desirable to have multiple remote sites each with a document processor and each feeding a central host computer with information necessary to maintain the records on the checks processed and balances of each account.

It has been proposed that the central computer might store both the images and the codeline data (or machine-readable data) from each check in a central database. However, this would require substantial communication resource because the images represent large records, even when they are compressed using efficient compression techniques, and all the images must be moved from the remote site to the central site.

It has also been suggested in prior art systems that the images and codeline information be processed at a remote computer located at the remote site where the images were originally captured (the same site as the document sorter). This would avoid the necessity for large amounts of communication but would mean that the financial information on the checks would have to be uploaded at a later time from the various remote locations to central and the remote sites must have a check processing system to capture the codeline data and control the processor locally.

Those systems which suggest using additional check software at the remote either are duplicates of the main site or are different from the main site. If they are duplicates, then the remote site requires an additional host with additional staff at the remote site. If the systems are different, then the bank must support a second type of check software system for its remote sites.

Accordingly, the document processing systems of the prior art have significant limitations and disadvantages.

SUMMARY OF THE INVENTION

The present invention overcomes the limitations and disadvantages of the prior art systems by providing a system for processing documents where images are captured and stored at the remote site, while the codeline is captured by the document processor and is concurrently transmitted to the central location where the financial records are kept.

The present invention has the advantageous effect of avoiding huge communication system requirements that would be necessary if images were to be passed from the remote sites to the central site. The present invention also has the advantageous effect that any image that is desired can be located and obtained by a processor at any of the remote sites or even the central site by using unique identifiers for every document captured.

The present invention has the advantageous effect that the central database has the information necessary to update the financial records of the bank to handle the accounting necessary for the various accounts.

The present invention also has the advantageous effect of maintaining images at the remote site to allow image statements and other applications to be run at the remote site and not have to obtain images from the central site again requiring massive communication resources under the best of circumstances.

The present invention avoids the requirement of a separate remote check system software and host computer resources associated therewith.

Other objects and advantages of the present invention will be apparent to those skilled in the art in view of the following detailed description of the invention and the appended claims.

DETAILED DESCRIPTION OF THE PREFERRED EMBODIMENT

Figure 1:
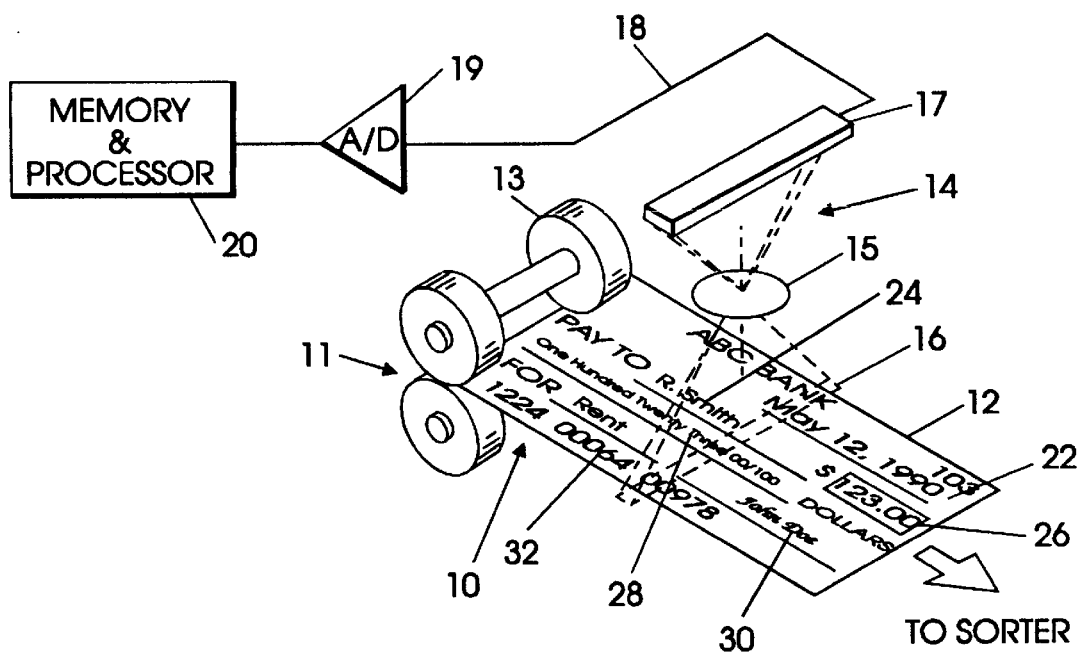
FIG. 1 illustrates the environment of the image processing system of a document processor of the present invention.

FIG. 1 illustrates an image capture system 10 within a document image processing system 11, such as IBM's Model 3890 ImagePlus High Performance Transaction System. Such a system typically uses a transport 13 to move a document 12 one at a time from an input hopper (not shown) sequentially past a plurality of other processing stations and finally into one of several output hoppers or pockets, based usually upon the information content read from the document under program control as it passes. This transport moves the document at a high speed (over 300 inches per second in a Model 3890 which allows the system to process 2400 documents per minute).

An optical system 14 including a focusing lens 15 uses an extended array 17 to capture an electrical representation of each line 16 of the document, based on either the black/white or gray characteristics of the document. While the resolution of the system depends on the design and components, one example divides each inch into 240 picture elements (pels or pixels) in each of the horizontal and vertical directions.

The array 17 is commercially available from various manufacturers, such as Reticon, and may be a charge coupled device in which the impinging light on each sensor develops an electrical signal proportional to the amount of light. The electrical signals pass on line 18 to an analog-to-digital converter 19, which together with thresholding, converts each pel into a digital representation which is then stored in memory 20 for storage and/or further processing as desired. For further details of an image capture and processing system, see the Dinan Patent, which is specifically incorporated herein by reference.

The document 12 includes a variety of indicia, some of which may be printed and some may be handwritten. Other documents may include typewritten characters or those printed by machine. This indicia includes a date field 22, a payee line 24, an amount field 26 (sometimes referred to as a "courtesy amount field" which comprises numerals rather than words in most cases), a field 28 including the amount in words, a signature 30 and a MICR codeline 32. The transport also includes a codeline reading device, such as a MICR reader, for reading and storing the MICR codeline in conjunction with the image for a particular document. That is, the images are correlated with the codelines read for the individual documents.

Figure 2:
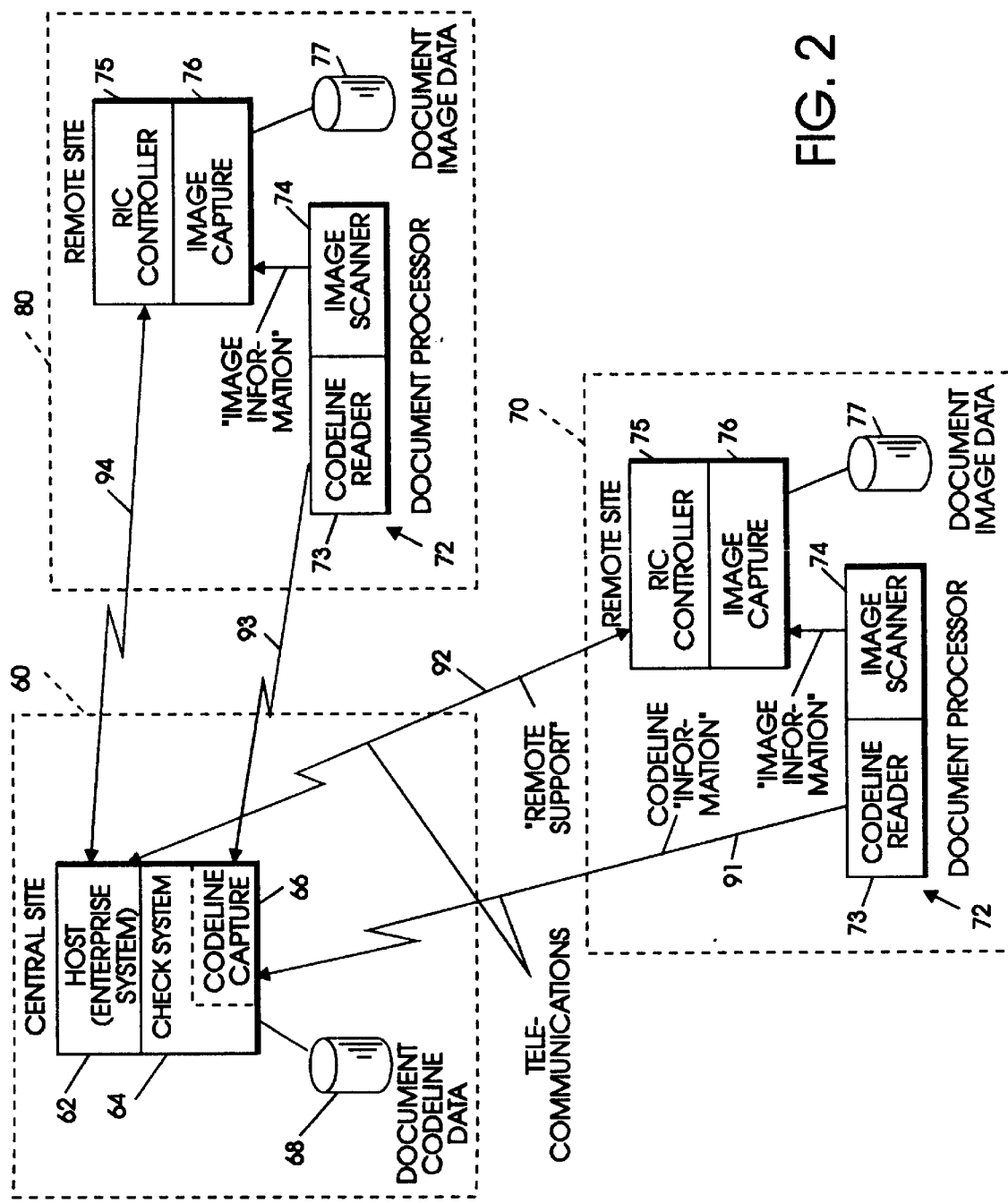
FIG. 2 is a schematic drawing of the remote and central systems of one embodiment of the present invention.

FIG. 2 illustrates schematically the elements of the document processing system of the present invention. It includes a central site 60 and two remote sites 70, 80. At the central site is a host computer 62, preferably an Enterprise System of the type sold by IBM as the System/390 or similar large mainframe computer. Running on the host system 62 is a check operating and control system 64 which is preferably an IBM program product sold by IBM under the name Check Processing Control System (CPCS). One module of that check system 64 is a codeline capture module 66. The check system 64 is coupled to a database of document codelines 68. Alternately, other check operating and control systems (such as the SuperMICR program product) could be used in the embodiment of the present invention. The check operating system 64 in any event runs at the central site 60 and controls the remote sorter(s) including passing control signals to start and stop the operation.

The remote site 70 includes a document processor 72 with a codeline reader 73 and an image scanner 74. The codeline reader 73 is coupled by telecommunication line 91 to transmit codeline information to the codeline capture module 66 at the central site. The image scanner 74 is coupled to the remote image controller (or RIC) 75 running image capture software 76. The image capture software 76 stores the information from the document on a document image database 77. The remote image controller 75 is also coupled to the host system 62 by communication line 92 to pass control information from the host system to the remote image controller.

The present invention provides a distributed system whereby the user interface (image workstation) and the image database 77 are at the remote site 70. The codelines 32 are stored at the storage 68 at the central site 60. Other system functions including control, configuration, etc. are located at either the remote sites 70 or central site 60 or some combination.

Distributed applications such as IBM's Proof of Deposit applications, Statements and Archive run at the remote sites using codeline data and control information stored at the central site and using data stored in the remote image controller 75. The Proof of Deposit applications include Data Preparation, Reco/Keying, Balancing and Work-in-Process. Each of these applications operate in remote sites (such as site 70) with control and instructions coming from the central site 60, particularly the host system 62 via communication line 92. Accordingly, the work flow control of a remote site, particularly its controller, is provided from the central site 60 and its processor 62 and its check operating system 64.

Similarly, remote site 80 includes a duplicate or similar configuration of the hardware and software at remote site 70, but in a different geographic location.

The codeline reader from the remote site 80 is connected by communication line 93 to the codeline capture module 66 at the central site and the remote image controller at remote site 80 is coupled by communication line 94 to the host system at the central site.

Figure 3:
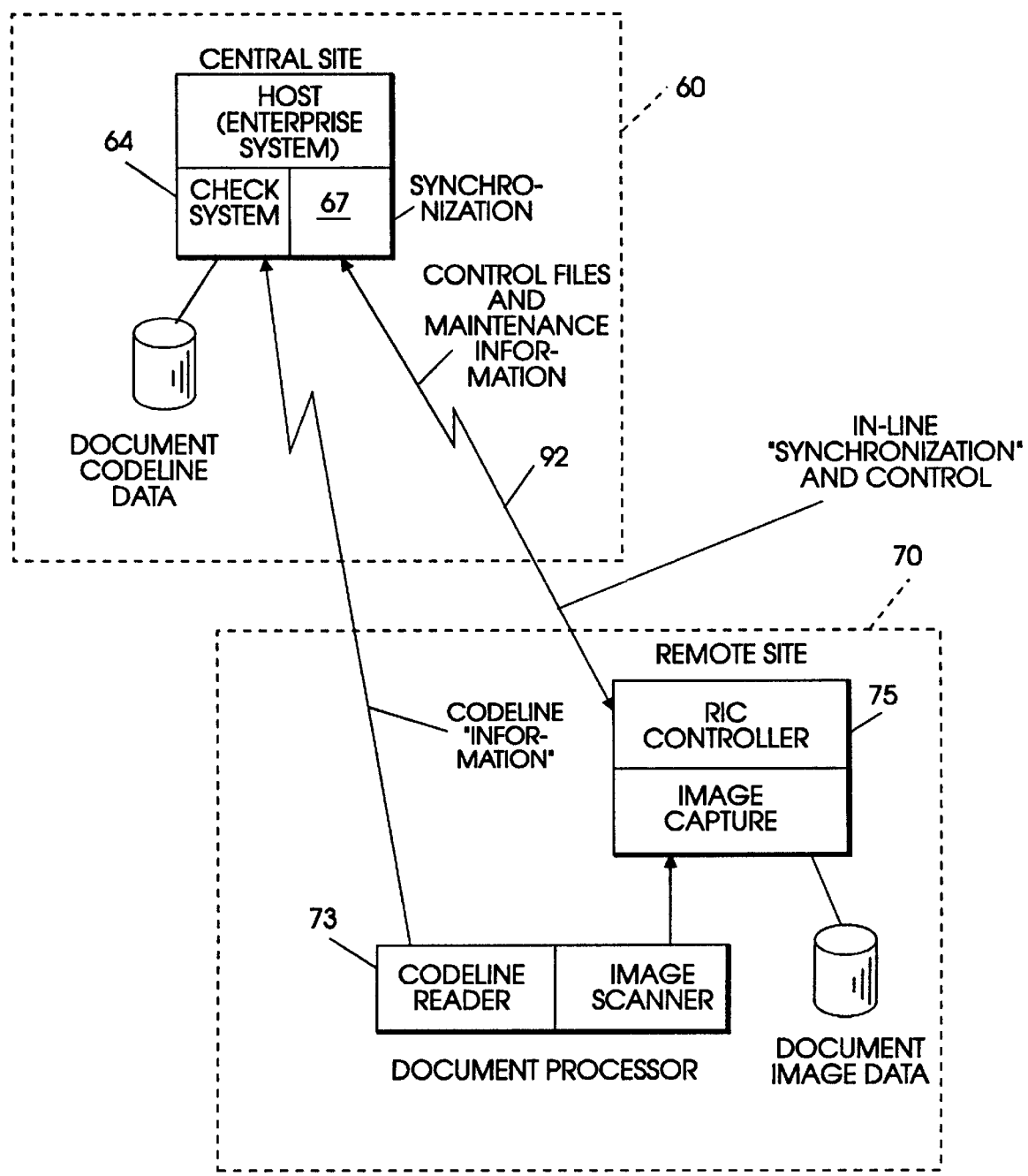
FIG. 3 is a schematic drawing of the remote and central systems of an alternate embodiment of the present invention.

FIG. 3 illustrates the use of the central site with the addition of synchronization software 67 which allows the inline synchronization of image capture information with the codeline information being provided by document reader 73 and transmitted to check system 64. The synchronization software 67 is involved in communication (i.e., sends and receives) of control information from the central site to the remote site and vice versa to make sure that the codelines and the images remain in synchronization. The remote image controller 75 is preferably a controller-type processor, not an enterprise sized mainframe. For example, the controller 75 may advantageously be an IBM RISC System/6000 (RS/6000) or an IBM AS/400. The size and speed of the controller 75 are chosen to match the job, based on the type and number of check sorter(s) attached, driving the amount and speed of image information generated. For example, if an IBM 3890 is used to process documents, a Model 580 of the RS/6000 might be used. If two IBM 3890 document processors are used at a single site, a Model 590 of the RS/6000 may be appropriate. For IBM 3892 Document Processor, a Model 560 RS/6000 might be used for the controller 75. Communications line 92 is also used for distributing control files from the central site 60 to the remote site 70 along communications line 92. Maintenance information can also be communicated from the central site 60 to the remote site 70 along the communications lines.

In the case of document jams, such synchronization software allows the system to be restarted without loss of information or synchronization, or with a minimum of reprocessing of documents on the occasion of a jam or other system stoppage.

Figure 4:
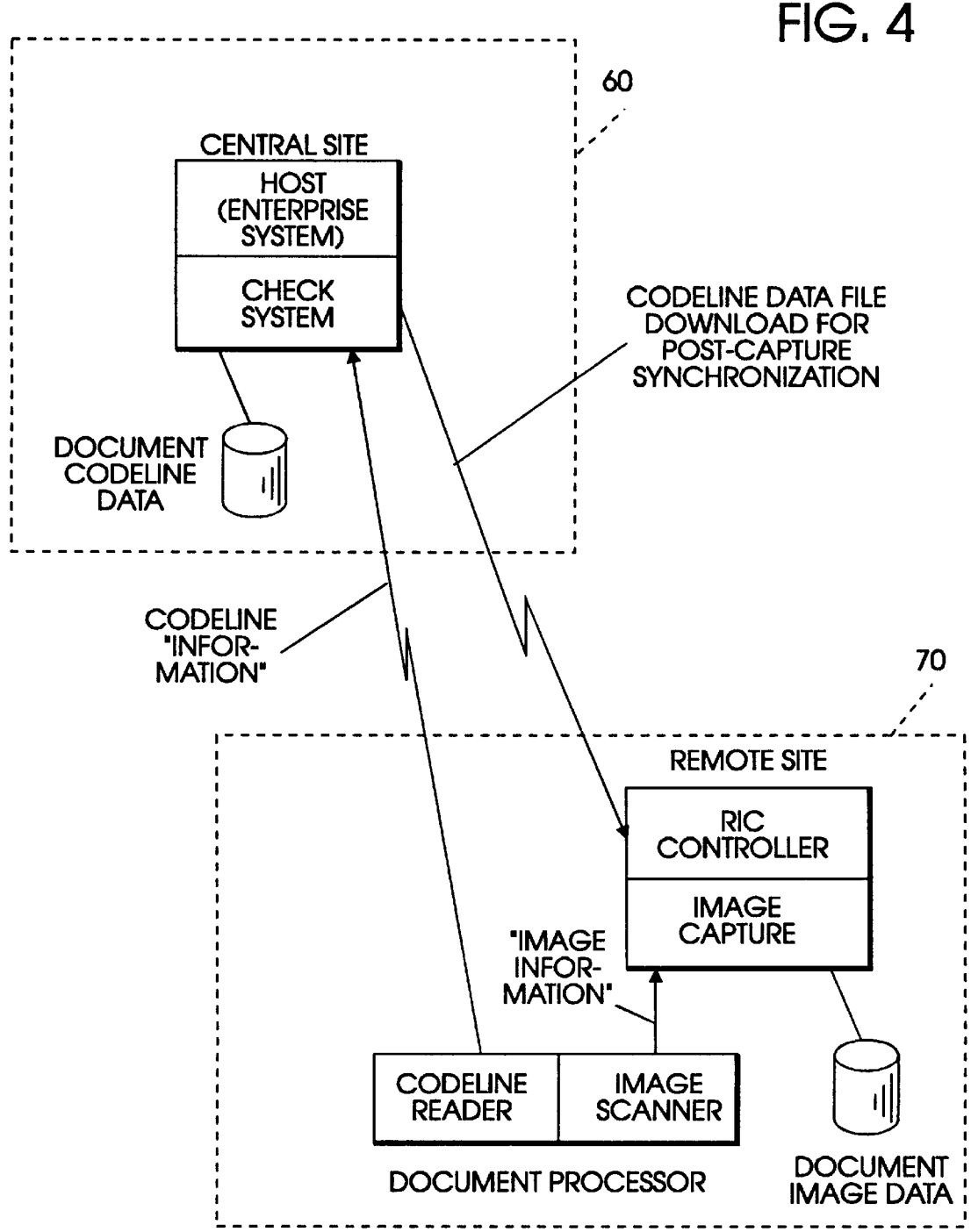
FIG. 4 is another schematic drawing of the remote and central systems of another alternate embodiment of the present invention.

FIG. 4 illustrates a remote image processing system in which codelines and images are captured independently, then matched later as an alternative method of synchronizing the image and codeline data.

Of course, many modifications and adaptations of the systems that are disclosed in the present application are possible without departing from the spirit of the present invention. Those skilled in the art of processing documents and image processing will realize that some features of the present invention can be used to advantage without the corresponding use of other features. For example, the present invention envisions that images will be stored at the remote locations and will not be transmitted contemporaneously to the central processing site. However, those skilled in the art will realize that copies of the images could be archived and located at another location to avoid consequences from natural disasters and malicious activity as well as simple misplacement.

Accordingly, the present invention does not preclude the copying of the image archive periodically and shipping an archive copy either to an off-site storage or to central location for various purposes including back-up or providing and maintaining the archive at the central site.

The present invention also has the flexibility of allowing multiple remote image controllers (e.g. 75) at a single remote site (e.g., 70). An enterprise could have a single (or multiple) central site(s) (e.g., 60) each with a variable number of remote sites, not limited to the two shown in FIG. 2. A single remote image controller may operate multiple document processors. In any event, the image data base associated with a controller should be accessible using conventional techniques for access.

Accordingly, the foregoing description of the preferred embodiment should be considered as merely illustrative of the principles of the present invention and not in limitation thereof. The present invention is limited solely by the appended claims.

Having thus described the invention, what is claimed is:

1. A method of obtaining information of two different types from a plurality of sequential documents comprising the steps of:

moving the documents in sequence past a first station for reading information of a first type and a second station for reading information of a second type;

storing information obtained from the first station on a local storage device where the documents have been passed by the first and second stations;

transmitting information of the second type obtained from the second station to a storage device located at a distance, said remote storage device storing said information of the second type but not information of the first type; and storing said second type of information at the distant location, wherein the step of storing information at the distant location includes storing codeline information obtained from the plurality of documents at a location remote from the first and second stations.

* * * * *